(12) United States Patent
Amatucci

(10) Patent No.: US 6,252,762 B1
(45) Date of Patent: Jun. 26, 2001

(54) RECHARGEABLE HYBRID BATTERY/ SUPERCAPACITOR SYSTEM

(75) Inventor: Glenn G. Amatucci, East Brunswick, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/295,537

(22) Filed: Apr. 21, 1999

(51) Int. Cl.[7] .............................. H01G 9/00; H01G 9/155; H01M 4/58
(52) U.S. Cl. ...................... 361/503; 361/502; 429/231.95
(58) Field of Search .......................... 361/502, 503, 361/504, 505, 506, 507, 508, 509, 510, 511, 512, 516, 517; 429/231.9, 231.95, 229, 231.1, 231.8

(56) References Cited

U.S. PATENT DOCUMENTS 5,460,904 * 10/1995 Gozdz et al. ..................... 429/316
5,545,468 * 8/1996 Koshiba et al. .................. 429/231.1
5,635,138 * 6/1997 Amatucci et al. ................. 422/104
5,953,204 * 9/1999 Suhara et al. .................... 361/502

FOREIGN PATENT DOCUMENTS 195 48 005 * 7/1996 (DE) .............................. H01G/9/00

* cited by examiner

Primary Examiner—Dean A. Reichard
Assistant Examiner—Eric Thomas
(74) Attorney, Agent, or Firm—David A. Hey

(57) ABSTRACT

A rechargeable hybrid battery/supercapacitor electrical storage system capable of providing high energy and high power densities comprises an intercalation electrode (17) and a capacitor electrode (13) combined with a separator (15) and electrically-conductive current collector elements (11, 19) to form a unitary cell structure (10). An electrolyte solution of a dissociable salt absorbed into the porous structure of the separator (15) provides complementary ion species which respectively reversibly intercalate into the one electrode (17) and capacitively adsorb at the surface of the other electrode (13) upon the application of charging current. The high density stored electrical energy may be recovered at high power over extended periods upon demand of a utilizing device and may be rapidly restored to stable capacity through numerous charging cycles.

20 Claims, 4 Drawing Sheets

RECHARGEABLE HYBRID BATTERY/SUPERCAPACITOR SYSTEM

BACKGROUND OF THE INVENTION

The present invention relates to electrical energy storage systems which may be recharged over numerous cycles to provide reliable power sources for a wide range of electrical utilization devices. The invention is directed in particular to a rechargeable storage system which is capable of exhibiting both high energy density normally associated with batteries, and high power density and long operative life typical of supercapacitors.

In the present invention, such a system comprises a multi-layer energy storage device structure which incorporates respective positive and negative electrode elements comprising pseudocapacitor or double-layer supercapacitor materials and rechargeable intercalation battery materials in a unitary, flexible structure which may be sized and shaped as desired to be most compatible with utilization devices while providing advantageously high energy and power densities.

Modern applications requiring mobile electrical energy sources, ranging from personal telecommunications devices to electric vehicles, are proliferating at an exponential rate. The demands of these applications range widely, for example, in voltage or power level, but all are preferably served by light-weight storage devices which can rapidly provide consistently high energy density over long time spans and can be quickly recharged to operational energy levels. To date, these extensive mobile energy needs are being met, in a fashion, by one or the other of the two available types of storage devices, viz., rechargeable batteries, such as lithium-ion intercalation systems, or supercapacitors of either faradic pseudocapacitive or non-faradic double-layer reaction type.

The choice between these battery or supercapacitor systems is normally dictated by the more pressing of the application's demand for high energy density, available from batteries, or for the rapid delivery of high power, provided by supercapacitors. Attempts to meet requirements for both high energy and high power densities in a single application have led in some instances to the utilization of both device types arranged together in such a manner that the battery is available to recharge the supercapacitor between periods of high power demand. The disadvantage of such a practice in the excessive weight factor alone is clearly apparent. Additional limitations on this expedient are reflected in the time requirement for battery charging, as well as in the multiplicity of cells and in battery life cycle which may often be shortened by the physical rigors of the intercalation battery charging operation.

The system of the present invention represents a remarkable advancement in means for meeting the requirements of mobile electrical energy utilization in that it combines the desirable characteristics of both the battery and the supercapacitor in a single integrated device of light weight and extended energy capacity. Comprising opposing electrodes of, for example, an activated carbon supercapacitor element and an intercalatable battery composition, particularly a transition metal oxide spinel material having a structure which exhibits rapid ion diffusion and little physical distortion from intercalation, the system is able to exhibit both the high energy storage capability of batteries and the high speed power delivery and exceptional cycle life of supercapacitors. An additional advantage of this unique combination of faradic battery intercalation and capacitive surface charging is the realization of intercalation systems which would not otherwise be available due to the sparsity of receptive counter-electrode materials able, for instance, to accommodate cations of considerable size, e.g., alkaline earth cations.

The hybrid systems of the present invention can utilize most of the respective compositions of previous rechargeable intercalation batteries and supercapacitor devices. Such earlier devices are typically represented, e.g., in U.S. Pat. Nos. 5,418,091 and 5,115,378. As in these earlier systems, intercalating electrodes may comprise metallic sulfides, oxides, phosphates, and fluorides, open-structured carbonaceous graphites, hard carbons, and cokes, and alloying elements, such as aluminum, tin, and silicon. Similarly, surface-active capacitor materials, typically high surface area closed-structure activated carbon powders, foams, fibers, and fabrics may be used in the counter-electrodes. The additional active electrolyte element of the hybrid systems may likewise be formulated of prior available materials, with particular utility being enjoyed in the non-aqueous solutions of intercalatable alkali and alkaline earth cations, usually incorporated in significantly fluid form in fibrous or polymer matrix containment materials, thus maintaining an environment conducive to mobility of both species of electrolyte ions. The laminated polymeric layer format typified by the secondary batteries described in U.S. Pat. No. 5,460,904 and related publications serves well for the structures of the present invention.

SUMMARY OF THE INVENTION

A hybrid battery/supercapacitor structure of the present invention comprises, in essence, negative and positive electrode members with an interposed insulative ion-transmissive separator member containing a fluid electrolyte. These functional members are preferably in the form of individual layers or membranes laminated together to form a flexible, unitary structure. The negative "battery" electrode member layer comprises a composition of an intercalatable material, preferably a spinel compound dispersed in a polymeric matrix of, for example, a copolymer of poly(vinylidene fluoride-co-hexafluoropropylene). To provide low resistance electrical current conduction between electrodes, the battery layer may be thermally laminated to a conductive current collector element, such as a reticulated metal foil. The positive "supercapacitor" counter-electrode member layer is similarly fabricated of an activated carbon composition in a matrix of the copolymer along with a current collector foil.

Interposed between the electrode members is the separator member which may comprise any of the previously employed high-porosity, microporous, or absorptive polymer film layers or membranes within which is dispersed a solution of electrolyte salt comprising an intercalatable cation, e.g., 1 M solution of $LiPF_6$ in a mixture of 2 parts ethylene carbonate and 1 part dimethyl carbonate. Such an electrolyte ensures essential ionic conductivity and mobility within the system structure. In the present invention this mobility serves the notable purpose of enabling the rapid flow of both ion species of the electrolyte salt to and from the respective electrodes during charge and discharge of the device. The high degree of fluidity enables a relatively unrestricted migration of the larger, previously inactive and unutilized anion species to adsorption at the positive electrode where they participate in the capacitive charging at that system member.

Thus the usual cation migration to effect intercalation within the negative electrode during a charging cycle, which normally serves as the sole mode of energy storage in prior battery structures, is augmented by anion migration from the electrolyte to the positive electrode surface to effect a capacitive charging, e.g., of the non-faradic double-layer type. This combined effect of faradic intercalation battery charging and non-faradic capacitor charging rapidly builds a high energy density which may be recovered in an equally rapid manner to yield high power density upon application demand. By judicial choice of electrode materials, that is, those respective intercalation and capacitor electrode member compounds presenting desired electrical charging potential differences, varied voltage levels may be achieved in the hybrid storage device.

BRIEF DESCRIPTION OF THE DRAWING

The present invention will be described with reference to the accompanying drawing of which.

DESCRIPTION OF THE INVENTION

Figure 1:
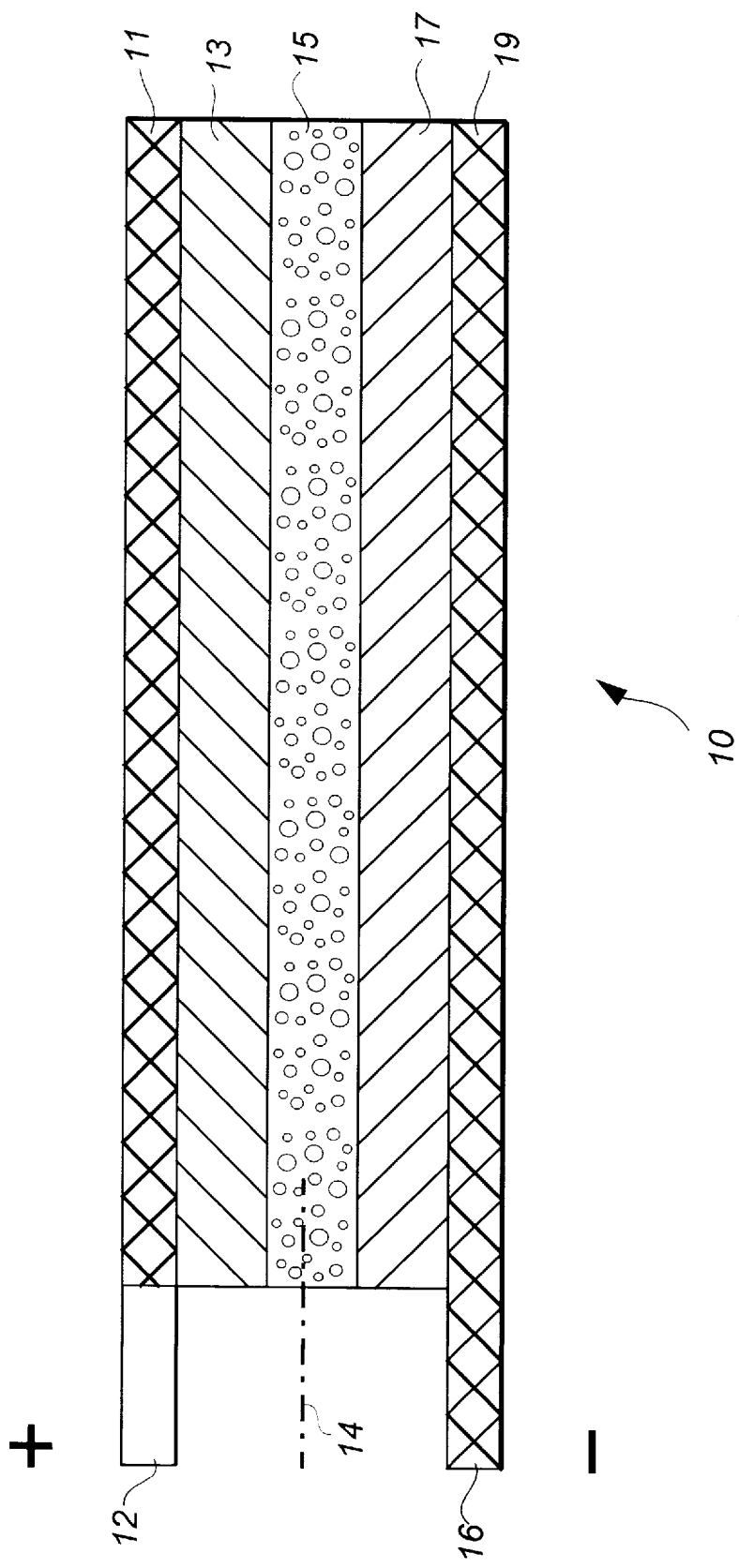
FIG. 1 is a diagrammatic representation in cross-section of a laminated hybrid battery/supercapacitor cell structure of the present invention.

A laminated hybrid battery/supercapacitor structure 10 typical of the present invention is generally depicted (not to scale) in FIG. 1 and includes a positive electrode member comprising a current collector foil 11, preferably in the form of an open mesh aluminum grid with an extending terminal tab 12, which is laminated under heat and pressure to electrode element 13 comprising an activated carbon layer, such as a carbon fiber fabric or a composition of powdered carbon in a polymeric binder matrix.

A negative electrode member comprises a current collector foil 19, preferably in the form of a open mesh copper grid having a terminal tab 16, similarly laminated to an intercalation electrode element 17 comprising, for example, a polymeric matrix in which is dispersed a finely-divided, e.g., in the sub-micrometer range, intercalation compound such as a preferred spinel, $Li_4Ti_5O_{12}$. The structure of this preferred compound advantageously presents intercalation sites of sufficient dimension that a system cation, e.g., $Li^+$, may be rapidly accommodated and diffused within the crystal structure without introducing expansion stresses which could lead to loss of energy storage capacity and useful life after extended charge/discharge cycling. While the noted spinel is remarkable in this respect, numerous other intercalation materials, such as those mentioned in the noted publications and hereafter in this specification, are entirely satisfactory for use in active compositions for the negative electrode of the present system.

A separator member comprising a membrane 15 of, for example, an ultra-high molecular weight micro-fibrillar polyolefin, a hyperporous copolymeric membrane, or other type of inert electron-insulating, ion-transmissive medium capable of absorbing electrolyte solution is interposed between electrode elements 13, 17 of the composite electrode members. The separator member of the system is preferably at least partially of thermoplastic or thermoadhesive composition in order to facilitate lamination by the application of heat and pressure to soften the surfaces of the separator membrane and effect its firm bonding to the system electrodes. In a testing mode, as noted below, the hybrid device may include a reference electrode 14.

Upon completion of the laminated cell structure, electrolyte solution of the type earlier described may be applied for a time sufficient to allow its absorption into the porous structure of separator 15 in order to provide the essential ion mobility within the system. Preferred electrolytes comprise non-aqueous solutions of dissociable salts providing intercalatable cation species, such as alkali, e.g., $Li+$, alkaline earth, e.g., $Mg^{++}$, lanthanide, $Al^{+++}$, or $Zn^{++}$ moieties. These electrolytes likewise provide for operation of the system such complementary anion species as $PF_6^-$, $BF_4^-$, or $ClO_4^-$.

A representative embodiment of the present invention may be more particularly fabricated and employed as shown in the following examples.

EXAMPLE 1

A separator membrane 15 is prepared in the manner which has served successfully in the fabrication of rechargeable Li-ion batteries, such as described in the earlier-noted patent specifications. In particular, the membrane is cast from a composition comprising a solution of 6 g of 88:12 poly (vinylidene fluoride-co-hexafluoropropylene) (VdF:HFP) copolymer of about $380 \times 10^3$ MW (available commercially from Atochem North America as Kynar FLEX 2801) and 10 g of a compatible organic plasticizer, dibutyl phthalate (DBP), in about 40 g of acetone. An additional 4 g of powdered fumed silica is dispersed into the solution in a mechanical blender, and the composition is cast and dried to a flexible membrane of about 0.075 mm thickness. The composition may comprise alternative plasticizers, such as dimethyl phthalate, diethyl phthalate, or tris butoxyethyl phosphate, and other inorganic filler adjuncts, such as fumed alumina or silanized fumed silica, may be used to enhance the physical strength of the separator membrane and, in some compositions, to increase the subsequent level of electrolyte solution absorption.

EXAMPLE 2

A positive electrode coating composition is prepared by suspending 10 g of a high surface area (1500 $m^2$/g) activated carbon powder in a solution of 20 g of 88:12 VdF:HFP copolymer (Atochem Kynar FLEX 2801) and 30 g of plasticizer (DBP) in about 160 g of acetone. The mixture is stirred in a mechanical blender for about 10 minutes to ensure homogeneity and is then cast and allowed to dry in air at room temperature for about 1 hour. The resulting tough, flexible supercapacitor electrode membrane 13 is readily cut to desired test cell size of about 50 mm×80 mm. An aluminum open mesh grid about 50 μm thick, e.g., a MicroGrid precision expanded foil marketed by Delker Corporation, is cut to form a current collector element 11 (FIG. 1) of about 50 mm×100 mm and placed in face contact with membrane 13 so as to provide an extending collector terminal tab 12 of about 20 mm. This assemblage is passed between rollers heated to about 125° C. A at a pressure of about 45 N per linear cm of roller contact where the polymeric electrode composition of membrane 13 is softened sufficiently to penetrate the open mesh of the grid collector 11 and establish a bond which firmly embeds the collector to form a unitary positive electrode member.

EXAMPLE 3

A negative intercalation electrode membrane is similarly prepared from a casting composition comprising a suspension of 10.5 g of pulverized $Li_4Ti_5O_{12}$ and 1.2 g of Super-P conductive carbon powder in a solution of 2.8 g of the VdF:HFP copolymer of Example 1 and 4.3 g of DBP in about 20 g of acetone. A 50 mm×80 mm electrode membrane 17 is likewise laminated to a current collector 19 of Microgrid expanded copper foil having an extending terminal tab 16. In preparing this electrode member and the counter-electrode of Example 2 care is taken to provide a reasonable balance in the respective amounts of active capacitor and intercalation materials comprising the final electrodes. Such a balance is based upon the predetermined energy storage capacity of the respective electrodes and is effected primarily by adjusting the cast thickness of the membranes. Thus, in these examples where the intercalation electrode provides the higher specific capacity, viz., about 150 mAh/g as compared to the 30 mAh/g of the capacitive charging electrode, that negative electrode membrane may be cast at a thickness providing the spinel at about 20% of the mass of the positive electrode activated carbon compound.

EXAMPLE 4

To complete the fabrication of a unitary hybrid battery/supercapacitor cell device embodying the present invention, the respective positive and negative electrodes members prepared in Examples 2 and 3 are arranged with an interposed separator membrane of Example 1, and the assemblage is laminated in the previous manner using a heated roller apparatus, such as a commercial card laminator, at a temperature of about 135° C. In order to avoid short-circuiting in the device, terminal tabs 12, 16 of the collector elements are formed from laterally spaced portions of grids 11, 19.

The final operation in the fabrication process entails activation of the hybrid cell device by addition of electrolyte solution in order to achieve ionic conductivity and to provide a sufficient reservoir of ion species to maintain the charge/discharge cycle activity. In this respect it should be noted that the present system utilizes not only cation species, e.g., $Li^+$, as an active charge transfer medium during reversible intercalation at the negative electrode in the manner of prior secondary batteries, but also relies upon anion species, e.g., $PF_6^-$, which effect charge storage in double-layer supercapacitor reactivity at the positive electrode. Thus, whereas one or the other of the intercalating electrodes of prior battery systems could represent a source of cations, the electrolyte serves as the primary source of both ion species in the present hybrid system. It is therefore important to provide sufficient electrolyte to support full and repeated charging over extended cycling. A useful measure of such electrolyte is an excess of 2 to 5 times stoichiometric amounts.

Sufficient such activation of cells having structures comprising separator members of preformed hyperporous films, microfibrillar membranes, or fibrous mats, such as 0.5 mm Whatman borosilicate fiber filter sheet, may be readily achieved by simple saturation of the separator with electrolyte solution. With cell structures of the present exemplary type comprising electrode and separator members of plasticized polymer composition, the addition of electrolyte is preferably accomplished through application of an electrolyte solution after extraction of the plasticizer from the copolymer composition of the structure by immersing the laminated cell structure 10 of FIG. 1 in a solvent for the plasticizer which has significantly little affect on the copolymer matrix material. For the described VdF:HFP copolymers, such a solvent may be diethyl- or dimethyl ether, methanol, hexane, or the like. The microporous structure formed throughout separator membrane 15 by moderately slow evaporation of the extraction solvent provides the laminated cell 10 with an abundance of sites for retention of any of the non-aqueous electrolyte solutions commonly employed in prior secondary polymeric batteries and supercapacitors.

Notably, there may be employed in the electrolyte solution such organic solvents as propylene carbonate, diethoxyethane, diethyl carbonate, dimethoxyethane, sulfolane, and dipropyl carbonate and mixtures thereof. Also, in the formulation of the activating electrolyte solutions, useful lithium salts include $LiClO_4$, $LiN(CF_3SO_2)_2$ $LiBF_4$, $LiCF_3SO_3$, and $LiSbF_6$ which may be employed in solution concentrations of between about 0.5 and 2 M. Of particular utility are the exceptional ethylene carbonate/dimethyl carbonate compositions of $LiPF_6$ and mixtures with $LiBF_4$ described in U.S. Pat. No. 5,192,629.

EXAMPLE 5

In preparation for using such an electrolyte, laminated polymeric cell structure 10 is immersed in a body of diethyl ether where, under mild agitation for about 10 minutes, the DBP component of the electrode and separator membrane compositions is extracted. After removal from the extracting bath and air-drying at room temperature, the cell is activated under a moisture-free atmosphere by immersion in a 1 M electrolyte solution of $LiPF_6$ in a 2:1 mixture of ethylene carbonate (EC):dimethyl carbonate (DMC) for about 10 minutes during which it imbibes the electrolyte solution into the microporous laminate structure to substantially replace the original DBP plasticizer. Following a mild wiping with absorbent material to remove surface electrolyte, the activated battery/supercapacitor cell 10 is hermetically sealed, but for the extending terminal tabs 12, 16, within a polyolefin envelope (not shown) to maintain a moisture-free environment.

EXAMPLE 6

A sample of the foregoing hybrid battery/supercapacitor cell device is modified during fabrication for testing purposes by insertion of a silver wire electrode 14 into separator membrane 15 in order to provide a common reference datum against which to measure the voltage characteristics during charge/discharge cycling of the device. For comparison purposes, respective prior art Li/C Li-ion intercalation battery and C/C double-layer supercapacitor cells are similarly modified in preparation for charge/discharge cycle testing. With a comparative voltage of approximately −0.05 V vs. Standard Hydrogen Electrode (SHE), the Ag pseudo electrode provides a practical near-zero datum against which to plot cell operation as progressive voltage changes at the respective electrodes during charge and discharge cycle activity.

Figure 2:
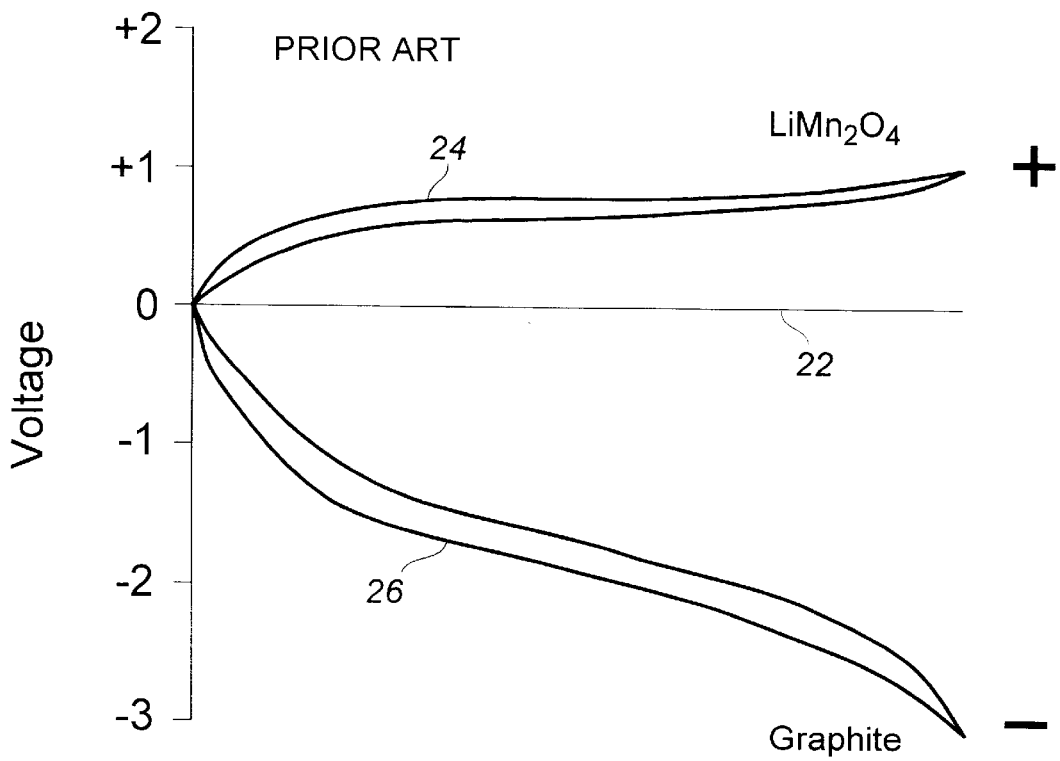
FIG. 2 is a graphical representation of the charge/discharge voltage characteristics of the respective electrodes in a typical lithium-ion intercalation battery of the prior art.

In this manner, for example, the voltage levels of deintercalation and intercalation of Li$^+$ions at the respective positive and negative Li$_x$Mn$_2$O$_4$ and graphite electrodes during charge and discharge of a prior battery cell incorporating laminated PVdF:HFP membranes and LiPF$_6$:EC:DMC electrolyte may be traced as shown in FIG. 2 where the voltage levels 24, 26 at those electrodes reach about +1.0 V and −3.01 V to yield a full charge battery voltage of about 4.01 V. Conversely, as seen in FIG. 2, during discharge of the battery cell with deintercalation of Li$^+$ions from the negative graphite electrode to intercalation at the positive spinel electrode, the respective electrode voltages move back toward the base datum.

EXAMPLE 7

Figure 3:
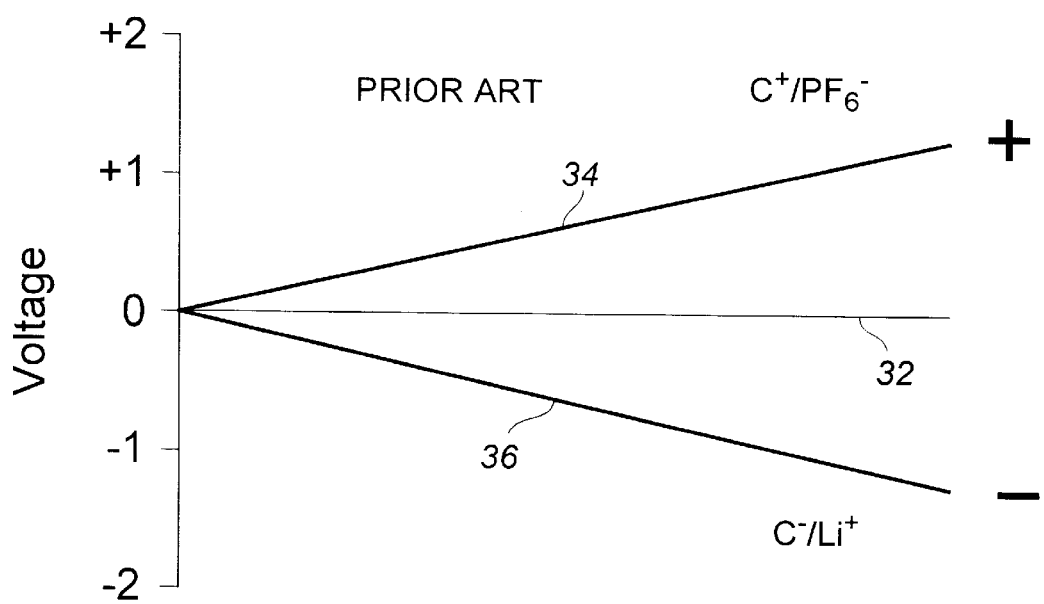
FIG. 3 is a graphical representation of the charge/discharge voltage characteristics of the respective electrodes in a typical double-layer supercapacitor of the prior art.

In similar manner, the voltage change characteristics during charge/discharge cycling are plotted for a prior art laminated polymer matrix double-layer supercapacitor comprising activated carbon electrode membranes. The structure is substantially similar to FIG. 1, utilizing PVdF:HFP copolymer and the electrolyte of Example 6. As shown in FIG. 3, the symmetrical, regular change of respective charging electrode voltages 34, 36 from the base datum 22 to +1.25 V and −1.25 V during each cycle is typical of capacitive charging and reflects the similar composition of those electrodes.

EXAMPLE 8

Figure 4:
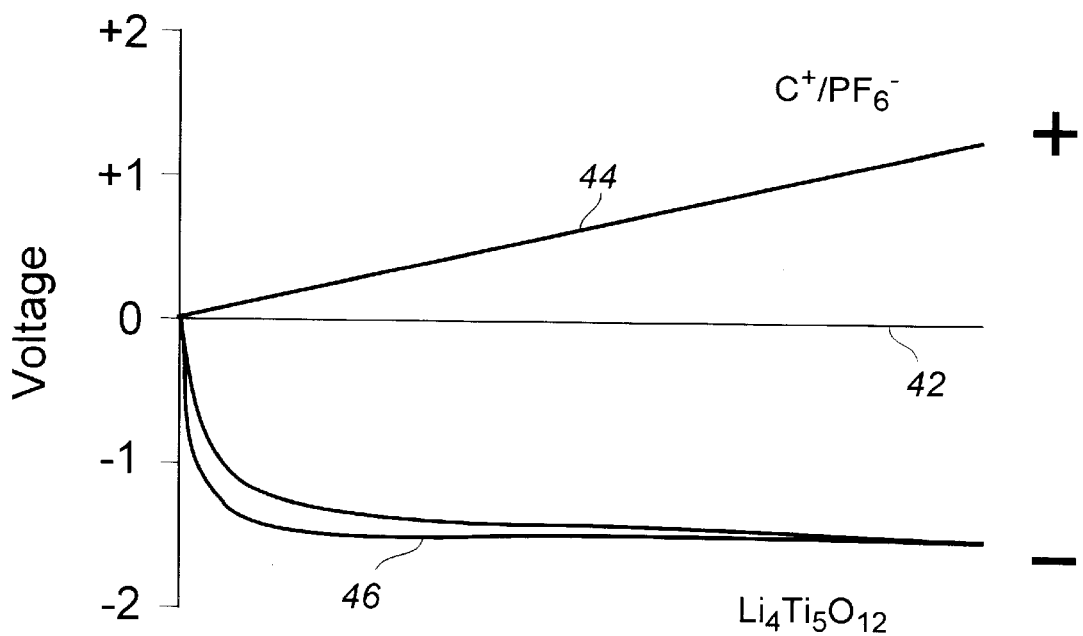
FIG. 4 is a graphical representation of the charge/discharge voltage characteristics of the respective electrodes in a hybrid battery/supercapacitor system of the present invention.
Figure 5:
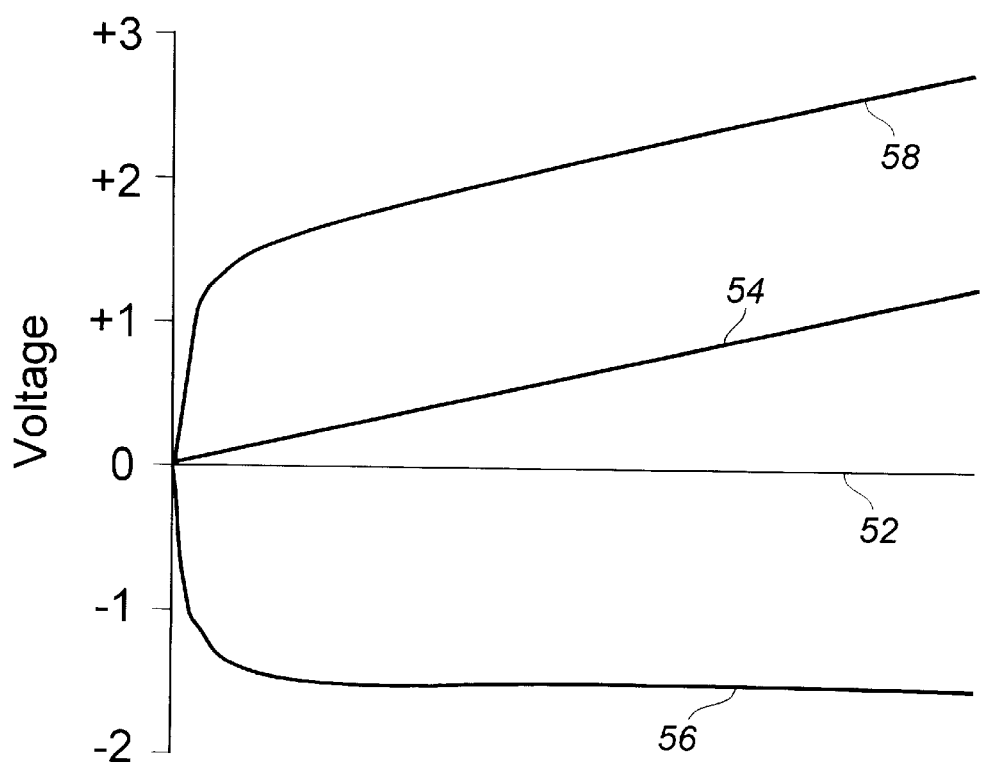
FIG. 5 is a graphical representation of the individual electrode and composite hybrid system voltage levels in an embodiment of the present invention.

The hybrid battery/supercapacitor embodiment test cell of Example 6 is cycled in the previous manner and the electrode voltage characteristics are plotted against the Ag pseudo standard base datum 42, as shown in FIG. 4. As was discovered from such an evaluation, it may be seen that the respective positive supercapacitor composition electrode and negative battery intercalation composition electrode retain their distinctive charge/discharge voltage characteristics 44, 46 between base datum and full charge levels of +1.25 V and −1.5 V. These representative charge cycling profiles confirm the functioning of the hybrid cell as a means wherein, upon charging, the Li$^+$ions of the electrolyte intercalate into the Li$_4$Ti$_5$O$_{12}$ spinel of the negative electrode to provide the high energy density charge 46 of a battery while the PF$_6$$^-$electrolyte ions adsorb at the positive activated carbon electrode to yield the high power density supercapacitor charge 44. As shown in FIG. 5, the combined functions of the electrodes which provide individual charging voltage accumulations along traces 54, 56 yield a cumulative linear charge voltage range 58 providing high energy and power density between about 1.5 V and 2.75 V with respect to datum 52.

Figure 6:
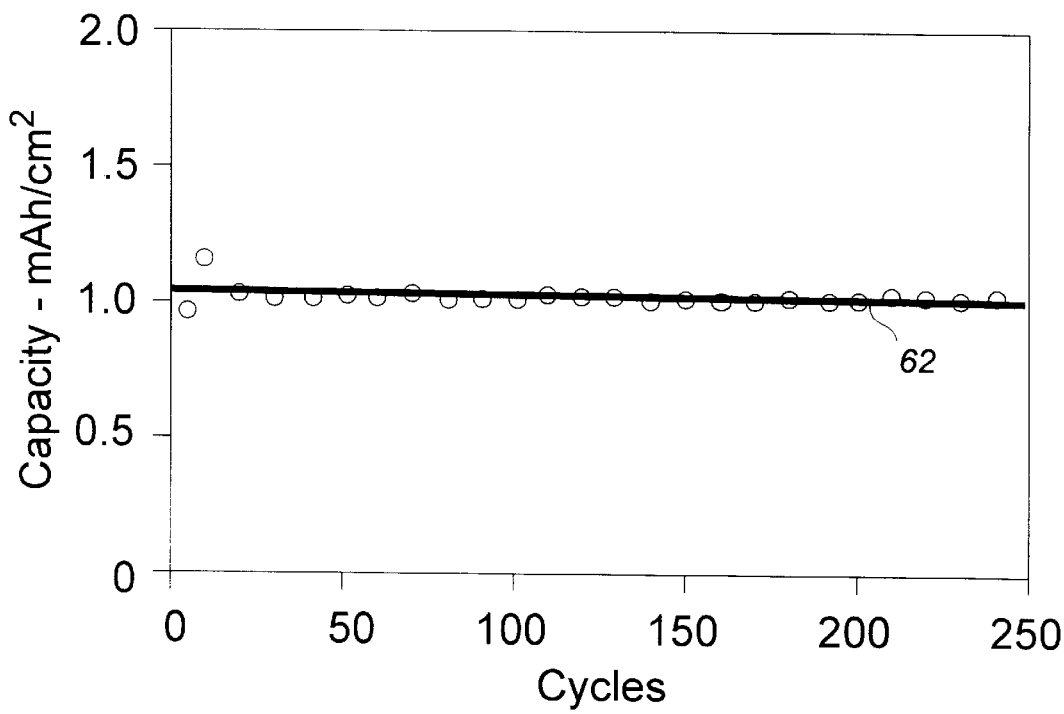
FIG. 6 a graphical representation of the charge capacity of an embodiment of the hybrid battery/supercapacitor system of the present invention over extended charge/discharge cycles.

The extraordinarily stable capacity of the hybrid battery/supercapacitor after extended operational cycling at a constant 1.12 mA may be seen at trace 62 of that property in FIG. 6. This advantageous characteristic reflects the generally high stability of supercapacitor devices and, in the present embodiment, is enhanced by the remarkable property of the Li$_4$Ti$_5$O$_{12}$ spinel of the negative electrode which enables intercalation without imparting degrading physical expansion stresses to the spinel structure.

Figure 7:
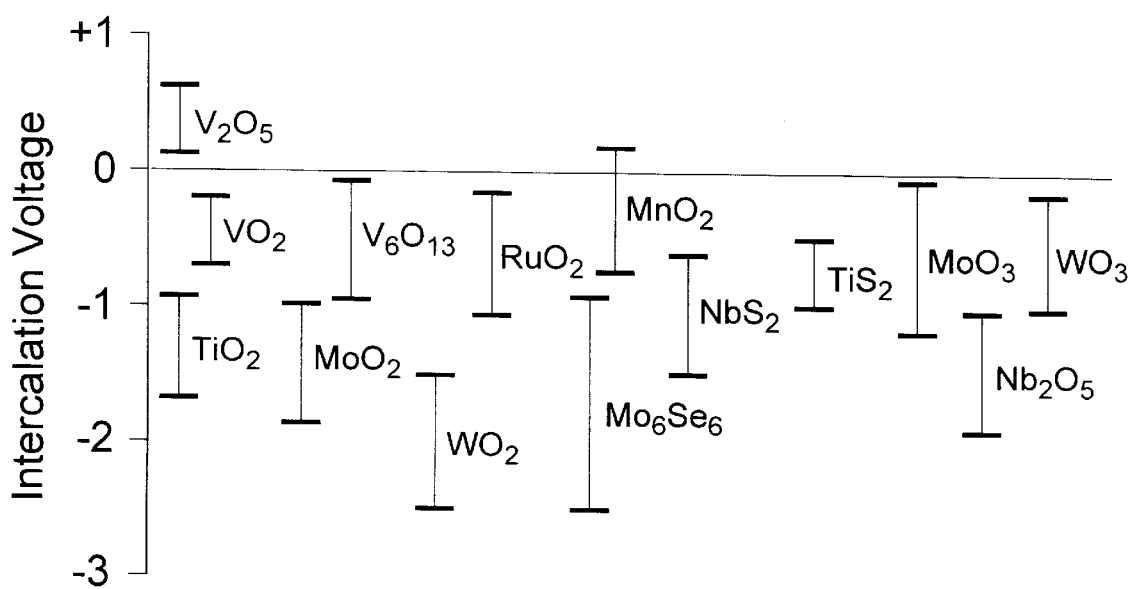
FIG. 7 a graphic chart of intercalation voltage ranges of a number of compounds useful in the fabrication of negative electrodes in the hybrid system of the present invention.

Other intercalation materials which may be employed with varying degrees of success in the hybrid cells of the present invention include sulfides, such as TiS$_2$, FeS$_2$, and ZrS$_2$; oxides, such as MnO$_2$, LiMn$_2$O$_4$, MoO$_3$, WO$_3$, TiO$_2$, Co$_3$O$_4$, Fe$_2$O$_3$, and Cr$_3$O$_8$; phosphates, such as LiFePO$_4$ and LiMnPO$_4$; fluorides, such as FeF$_2$ and FeF$_3$; carbonaceous materials, such as graphite, coke, and hard carbon; and alloying metals and compounds, such as Al, Sn, SnO$_2$, and Si. In order to obtain significant operating voltage ranges with the present hybrid system, it is preferred to select intercalation compounds and materials having intercalating voltage ranges which extend significantly below the capacitive charging ranges of selected supercapacitor electrode materials, e.g., activated carbon. The intercalating voltage ranges of a number of useful negative electrode substances as compared to the SHE datum are shown in FIG. 7. It has also been found satisfactory to employ the simpler expedient of mechanical Swagelock test block cells in the evaluation of electrode and electrolyte materials and system operation. Test data are seen to be comparable to those obtained with the more fully developed laminated cells described in the foregoing examples.

It is expected that other variants in the structure and fabrication of the hybrid battery/supercapacitor systems disclosed in the foregoing description will occur to the skilled artisan through the exercise of ordinary aptitude, and such variants are nonetheless intended to be included within the scope of the present invention as set out in the appended claims.

What is claimed is:

1. A rechargeable electrical energy storage system comprising in contiguity a positive electrode member, a negative electrode member, and a separator member interposed therebetween containing a fluid electrolyte comprising a cation and an anion of an ion species of a dissociable salt wherein
    a) said negative electrode member comprises a first material capable of reversibly intercalating said cation of said ion species in response to the application of an electrical charge of a first polarity, and
    b) said positive electrode member comprises a second material capable of reversibly adsorbing said anion of said ion species in response to the application of a contemporaneous electrical charge of opposite polarity.

2. A storage system according to claim 1 wherein said cation is selected from the group consisting of alkalies, alkaline earths, lanthanides, Al, and Zn.

3. A storage system according to claim 1 wherein said anion is selected from the group consisting of PF$_6$, ClO$_4$, BF$_4$, CF$_3$SO$_3$, and SbF$_6$.

4. A storage system according to claim 1 wherein said first material is selected from the group consisting of transition metal oxides, sulfides, phosphates, and fluorides, and alkali and alkaline earth metal-alloying metals and compounds.

5. A storage system according to claim 4 wherein said first material is a transition metal oxide spinel compound.

6. A storage system according to claim 5 wherein said first material is Li$_4$Ti$_5$O$_{12}$.

7. A storage system according to claim 1 wherein said first material is selected from the group consisting of open-structured carbonaceous graphites, hard carbons, and cokes.

8. A storage system according to claim 1 wherein said second material is selected from the group consisting of pseudocapacitor and double-layer capacitor electrode materials.

9. A storage system according to claim 6 wherein said second material is selected from the group consisting of high surface area activated carbon powder, foam, fiber, and fabric materials.

10. A storage system according to claim 1 wherein said electrolyte comprises a 0.5 to 2.0 M solution of at least one said dissociable salt in an organic solvent selected from the group consisting of ethylene carbonate, dimethyl carbonate, propylene carbonate, diethoxyethane, diethyl carbonate, dimethoxyethane, sulfolane, and dipropyl carbonate and mixtures thereof.

11. A storage system according to claim 10 wherein said at least one dissociable salt is selected from the group consisting of $LiPF_6$, $LiClO_4$, $LiN(CF_3SO_2)_2$, $LiBF_4$, $LiCF_3SO_3$, and $LiSbF_6$.

12. A rechargeable hybrid battery/supercapacitor system comprising a positive electrode member, a negative electrode member, and a separator member interposed therebetween containing a fluid electrolyte comprising a cation and an anion of an ion species of a dissociable salt wherein a) said negative electrode member comprises a layer comprising a first material capable of reversibly intercalating said cation of said ion species in response to the application of an electrical charge of a first polarity, and b) said positive electrode member comprises a layer comprising a second material capable of reversibly adsorbing said anion of said ion species in response to the application of a contemporaneous electrical charge of opposite polarity, c) said separator member comprises a microporous layer having dispersed therein a non-aqueous solution of said dissociable salt, and d) each said member is bonded to its contiguous members at their respective interface to form a unitary laminate structure.

13. A hybrid system according to claim 12 wherein each of said positive electrode member and said negative electrode member is bonded to a respective electrically-conductive current collector element.

14. A hybrid system according to claim 12 wherein a) each of said electrode member layers comprises a polymeric matrix having dispersed therein the respective ion-intercalating and ion-adsorbing material, b) said separator member layer comprises a polymeric membrane having dispersed therein a multiplicity of pores or voids, and c) said members are bonded by thermal adhesion at their polymeric surfaces.

15. A hybrid system according to claim 12 wherein said first material is selected from the group consisting of transition metal oxides, sulfides, phosphates, and fluorides, and alkali and alkaline earth metal-alloying metals and compounds.

16. A hybrid system according to claim 12 wherein said first material is selected from the group consisting of open-structured carbonaceous graphites, hard carbons, and cokes.

17. A hybrid system according to claim 12 wherein said second material is selected from the group consisting of pseudocapacitor and double-layer capacitor electrode materials and high surface area activated carbon powder and fibers.

18. A hybrid system according to claim 12 wherein said electrolyte comprises a 0.5 to 2.0 M solution of at least one said dissociable salt in an organic solvent selected from the group consisting of ethylene carbonate, dimethyl carbonate, propylene carbonate, diethoxyethane, diethyl carbonate, dimethoxyethane, sulfolane, and dipropyl carbonate and mixtures thereof.

19. A hybrid system according to claim 18 wherein said at least one dissociable salt is selected from the group consisting of $LiPF_6$, $LiClO_4$, $LiN(CF_3SO_2)_2$, $LiBF_4$, $LiCF_3SO_3$, and $LiSbF_6$.

20. A hybrid system according to claim 12 wherein a) said negative electrode member layer comprises $Li_4Ti_5O_{12}$, b) said positive electrode member layer comprises a high surface area activated carbon, and c) said electrolyte comprises a 1 M solution of $LiPF_6$ in a 2:1 mixture of ethylene carbonate:dimethyl carbonate.

* * * * *